(12) United States Patent
De Block

(10) Patent No.: US 6,634,055 B1
(45) Date of Patent: Oct. 21, 2003

(54) PIVOTAL COUPLING FOR WIPER ARM AND BLADE

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/623,102

(22) PCT Filed: Sep. 24, 1999

(86) PCT No.: PCT/DE99/02920

§ 371 (c)(1),
(2), (4) Date: Oct. 20, 2000

(87) PCT Pub. No.: WO00/38964

PCT Pub. Date: Jul. 6, 2000

(30) Foreign Application Priority Data

Dec. 28, 1998 (DE) .......................... 198 60 644

(51) Int. Cl.[7] ............... B60S 1/02; A47L 1/00
(52) U.S. Cl. ............... 15/250.32; 15/250.43; 15/250.451
(58) Field of Search ............... 15/250.32, 250.33, 15/250.31, 250.43, 250.361, 250.451, 250.452, 250.44, 250.351, 250.46, 250.201

(56) References Cited

U.S. PATENT DOCUMENTS 4,120,069 A 10/1978 Sharp
4,909,653 A * 3/1990 Biggs .......................... 403/24
5,319,826 A * 6/1994 Mower .................... 15/250.44
6,026,537 A * 2/2000 Hojnacki ............... 15/250.451
6,038,730 A * 3/2000 Chen .................... 15/250.452

FOREIGN PATENT DOCUMENTS

| DE | 198 38 883 A | | 3/2000 |
|---|---|---|---|
| EP | 0354279 A1 | * | 2/1990 |
| EP | 0 714 820 A | | 6/1996 |
| GB | 1 403 970 A | | 8/1975 |

* cited by examiner

Primary Examiner—Robert J. Warden, Sr.
Assistant Examiner—Laura C Cole
(74) Attorney, Agent, or Firm—Michael J. Striker

(57) ABSTRACT

In a device for pivotally connecting a wiper blade for motor vehicle windows to a wiper arm, coupling elements on a part of the wiper arm are comprised of support bores disposed in already existing side walls of the wiper arm, and a connection between the wiper arm and wiper blade is performed by loose, reusable securing elements which on the one hand, can grasp edge strips of reusable longitudinal strips that are part of the likewise existing support element and on the other hand, are supported with their pivot pins in the support bores of the wiper arm.

10 Claims, 3 Drawing Sheets

Figure 1:
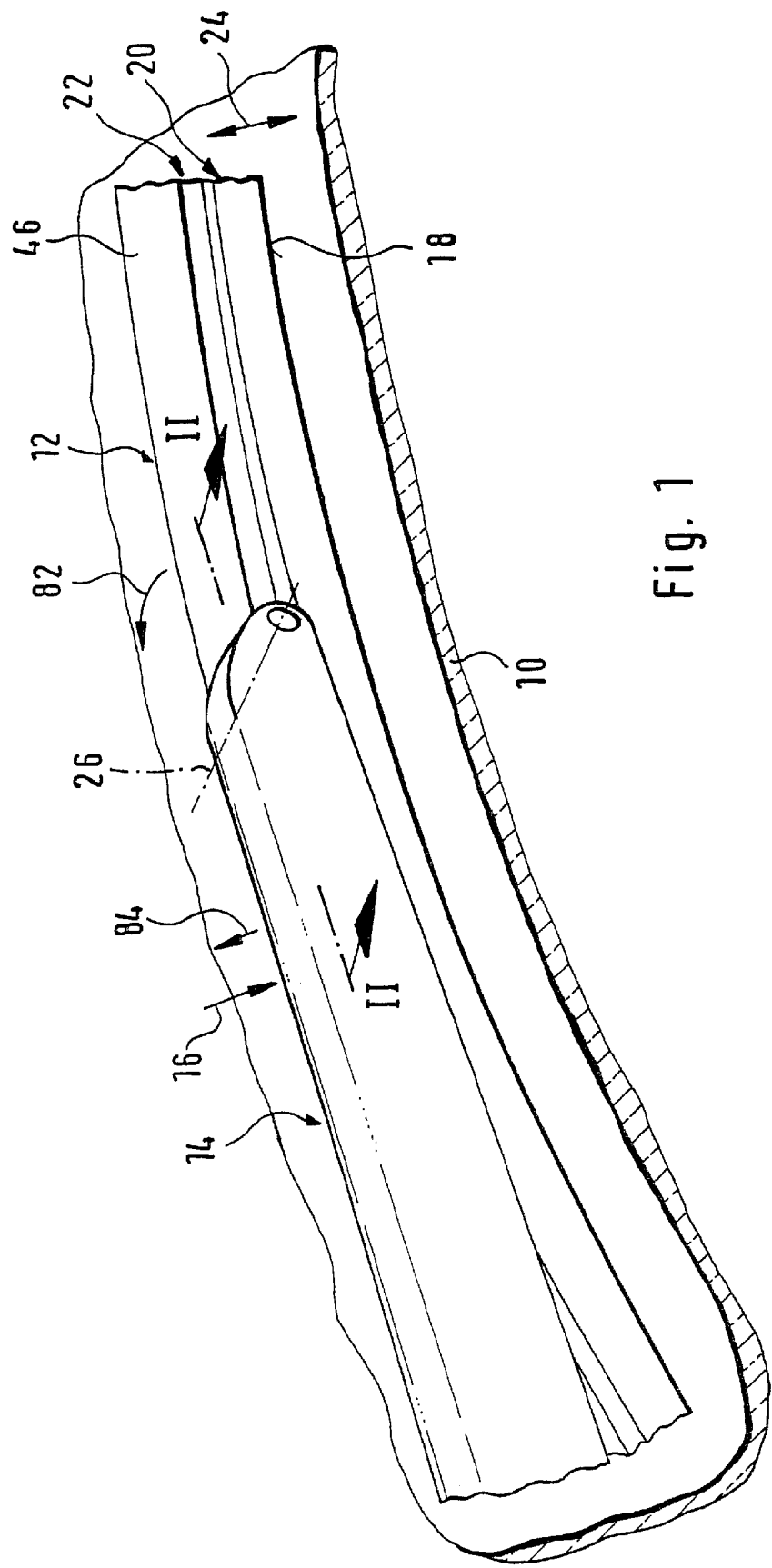

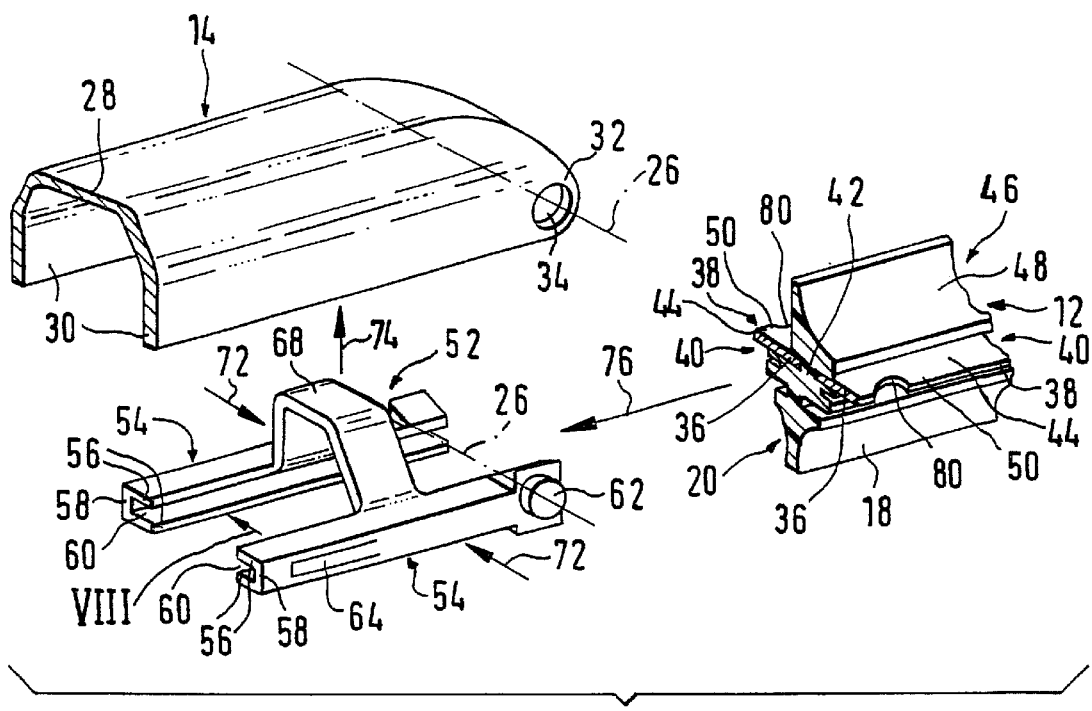
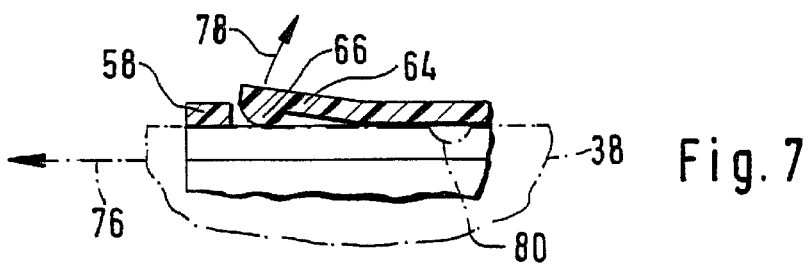
Fig. 7
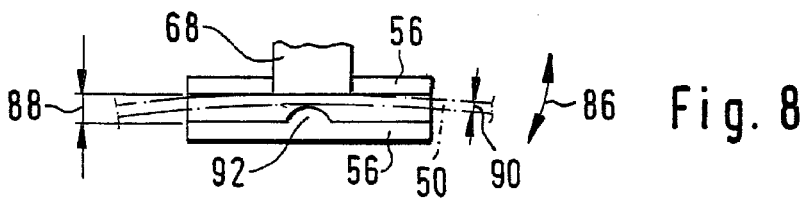
Fig. 8
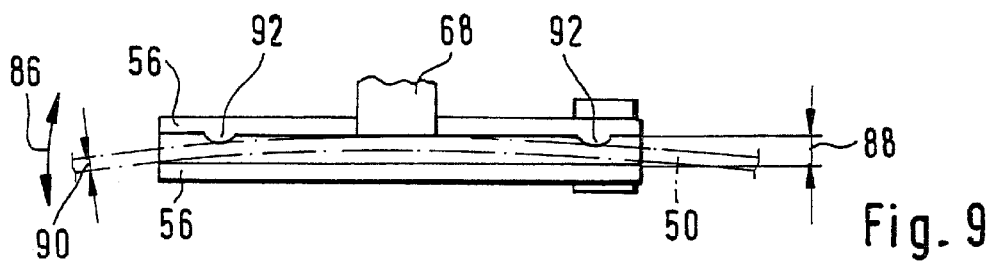
Fig. 9

PIVOTAL COUPLING FOR WIPER ARM AND BLADE

BACKGROUND OF THE INVENTION

The invention relates to a connecting device. A device of this type belonging to the prior art (DE 198 38 88 3.7), not yet published) includes two coupling halves that can be connected to each other, one of which is affixed to the wiper and the other is affixed to the support element of the wiper blade. The coupling halves, which are produced at a comparatively high manufacturing cost, are lost when the wiper strip connected to the support element and/or the wiper arm have to be replaced, for example due to wear.

SUMMARY

In the connecting device according to the invention the coupling means on the part of the wiper arm are comprised of support bores disposed in the already existing side walls of the wiper arm. An especially embodied coupling element can be eliminated. The connection between the wiper arm and wiper blade is taken over by loose, reusable securing elements which on the one hand, can grasp the edge strips of reusable longitudinal strips that are pat of the likewise existing support element and on the other hand, are supported with their pivot pins in the support bores of the wiper arm. Consequently, a special coupling element on the part of the wiper blade can also be eliminated.

The formation of the side walls containing the support bores is achieved in a simple manner if the wiper arm has an approximately U-shaped cross section at least over a partial longitudinal section and the support bores are disposed in the U-arms of the wiper arm, which constitute the side walls.

A particularly easy-to-produce pivotal connection is achieved if each of the two securing elements has an essentially C-shaped cross section, whose C-arms enclose the edge strips of the longitudinal spring strips of the support element, and the pivot pins are disposed on the outsides of the respective C-base because this allows each securing element to be inserted with its pivot pin into the associated support bore and then, the edge strips of the longitudinal spring strips of the support element, which are disposed in the longitudinal receiving grooves of the wiper strip, can be inserted into the receiving space enclosed by the cross-sectional form of the securing elements.

In order to assure a proper positioning of the connecting pivot in relation to the support element or in relation to the wiper strip, the pivot pins are each disposed on the one end section of their respective securing element and a resilient tab, which is connected to this securing element at one end, is disposed in each C-base of the two securing elements, spaced apart from them, and protrudes with a detent catch into the channel-like receiving space provided between the C-arms for each spring strip, and each of these spring strips is provided with a detent recess associated with the respective detent catch.

In order to simplify the preassembly of the two securing elements on the wiper arm, the two securing elements are connected to each other by resilient means and are placed with resilient tension against the side walls that face each other.

If the wiper strip is to be provided with a wind-deflecting strip on the side of the support element oriented away from the window, a lateral recess in the wind-deflecting strip for the resilient means can be avoided because according to a further development of the concept of the invention, the resilient means are constituted by an essentially V-shaped band that crosses the wiper strip and the free ends of its V-arms are respectively connected to one of the two securing elements.

In order to further simplify the connecting device, the two securing elements and the resilient band are made of an elastic plastic and are connected to each other in one piece.

An absolutely operationally reliable connection between the wiper blade—which includes the wiper strip and the longitudinal strips of the support element—and the wiper arm, which can withstand even the hardest wiper operation, is produced if in a modification of the invention, the wiper arm engages with its side walls fitting around the C-base of the two securing elements at their respectively remote outsides. As a result, the side walls of the wiper arm enclose the outsides of the resilient tabs of the securing elements which as a result can no longer be deflected and therefore are permanently fixed with their detent catches in their detent recesses in the spring strips of the support element.

So that in the vicinity of the securing elements, the support element spring strips are not stiffened by these securing elements, which would be disadvantageous with regard to the contact force distribution by means of the spring strips that are prestressed against the window, the distances between the two C-arms of the securing elements are greater than the thickness of the spring strip edge strips. Against the one inner wall of a C-arm of each securing element, there is at least one supporting catch that protrudes toward the other C-arm. As a result, a free space for the curved spring strips is produced, which permits the spring strips to freely oscillate in the channel-like receiving space. An impairment of the above-described characteristic curve progression of the spring strips during wiper operation, particularly against spherically curved windows, is prevented because their support in relation to the securing elements is not produced over a flat area but rather in a linear or punctiform fashion.

The connecting device according to another feature permits a particularly advantageous method for producing this pivotal connection with which in a first step, the securing elements are inserted with their pivot pins fro the side walls of the wiper arm that face one another into their support bores and then, the support element provided with the wiper strip is inserted with the edge strips of its longitudinal strips between the harms of the securing elements, and securing means are activated to affix the support element to the securing elements. The method according to the invention is distinguished by means of a sequence of simple, linear assembly motions so that it is particularly suitable for automation.

Other advantageous improvements and embodiments of the invention are disclosed in the following description of an exemplary embodiment shown in the accompanying drawings.

DRAWINGS

Figure 2:
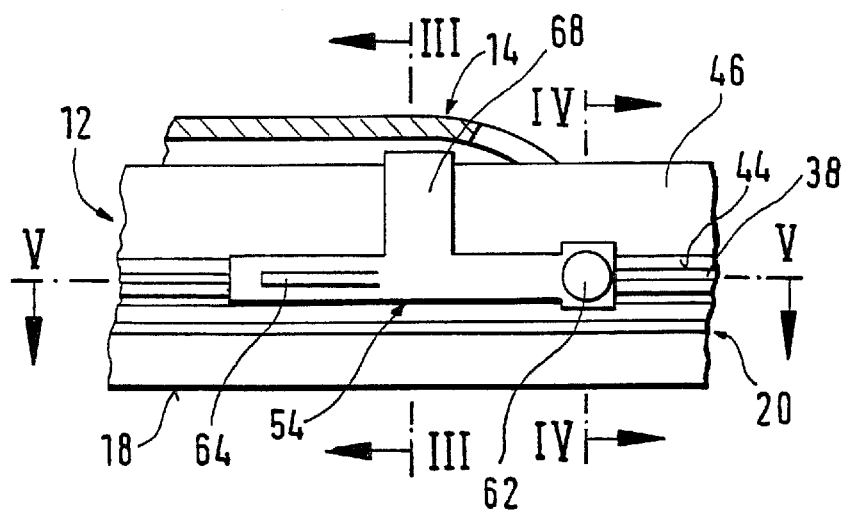
Figure 3:
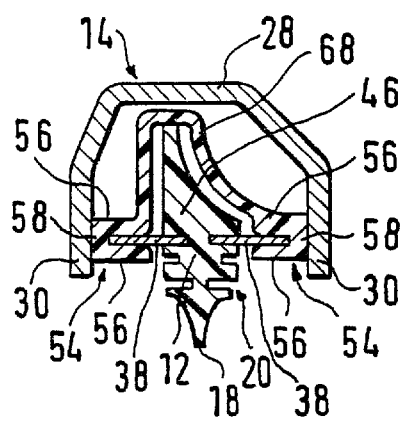
Figure 4:
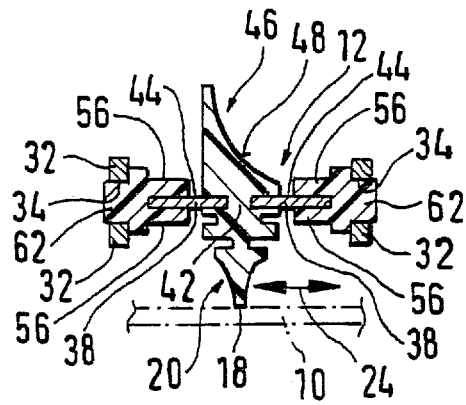
Figure 5:
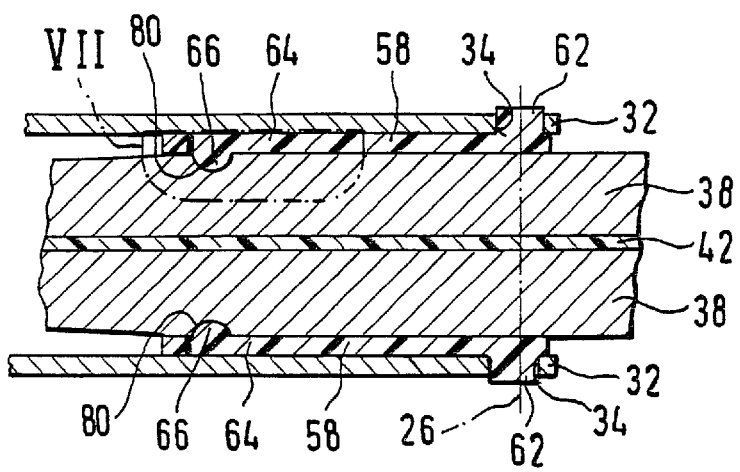

FIG. 1 is a perspective depiction of a midsection of a wiper blade, which is placed against a window and is pivotally connected to a wiper arm, FIG. 2 shows a partial section through the wiper arm and the wiper blade according to FIG. 1, along the line II—II and a side view of the wiper blade that is provided with securing elements, FIG. 3 shows the sectional plane of a section along the line III—III through the device according to FIG. 2, FIG. 4 shows the sectional plane of a section through the device according to FIG. 2, along the line IV—IV, FIG. 5 shows a section along the line V—V through the device according to FIG. 2, FIG. 6 shows the components required for the pivotal connection between the wiper arm and wiper blade, before assembly FIG. 7 shows a detail that is labeled VII in FIG. 5, with a spring rail that is not yet completely mounted and is depicted with dot-and-dash lines, FIG. 8 shows a rotationally depicted partial view of a securing element in the direction of the arrow VIII in FIG. 6, and FIG. 9 shows another embodiment of the securing element according to FIG. 8.

DESCRIPTION OF THE EXEMPLARY EMBODIMENT

In a perspective fashion, FIG. 1 shows a midsection of a wiper blade 12 that is placed against a window 10 of a motor vehicle; this midsection of the wiper blade is connected to the free end of a driven wiper arm 14 guided on the motor vehicle. The wiper arm 14 is loaded toward the window 10 in the direction of the arrow 16 and places the wiper blade 10 with the wiper lip 18 of its elongated, rubber elastic wiper strip 20 against the surface of the window 10 to be wiped. The wiper strip 20 is secured by a band-like, elongated support element 22, which includes two longitudinal strips 38 in the exemplary embodiment. The support element, however, can also be embodied as a one-piece band whose lower band surface oriented toward the window 10 has the wiper strip disposed on it and with edge strips, protrudes laterally beyond the wiper strip 20. The pivotal connection between the wiper arm 14 and wiper blade 12 permits a continuous adaptation of the wiper lip 18 to the as a rule spherically curved windows 10 when the wiper blade carries out its working movement (double arrow 24) between reversal points. In this connection, the wiper blade oscillates around a pivot axis 26, which is shown with dot-and-dash lines in FIG. 1.

FIG. 6 shows the embodiment of the free end of the wiper arm 14 with regard to the connecting device according to the invention. It has an essentially U-shaped cross section with a U-base 28 which is adjoined by two U-arms 30. The U-arms 30 are directed toward the window 10 (FIG. 1). In the working or moving direction (double arrow 24), they are disposed parallel to and spaced apart from each other. The U-arms 30 extend to the free end of the wiper arm and constitute side walls 32 there, which are disposed extending toward the window (FIG. 4). FIGS. 1 and 4 also show that each of the two side walls 32 is penetrated by a support bore 34 and that the two bores have a common longitudinal axis which is identical to the pivot axis 26.

The embodiment of the wiper blade 12 is particularly shown in FIGS. 3, 4, and 6. In these FIGURES. it is clear that spaced apart from the window 10 to be wiped, the elongated rubber elastic wiper strip 20 has two longitudinal grooves 36 which are open at the edge toward the mutually remote longitudinal sides of the wiper strip 20. The longitudinal grooves 36 are disposed in a common plane and are each used to contain a respective longitudinal strips 38 whose length approximately corresponds to the length of the wiper strip 20. The two longitudinal strips 38 are part of a band-like elongated spring elastic support element 40, which stabilizes the rubber elastic wiper strip 20. With an intermediary strip 42, the wiper strip 20 extends through between the two longitudinal strips 38 to the top side 44 of the support element 40 remote from the window 10. On this side, the wiper strip 20 is embodied as a wind-deflecting strip 46. Over its longitudinal span, which corresponds at least approximately to the length of the wiper strip 20, the wind-deflecting strip 46 has a longitudinal fluting 48, which is oriented toward the main flow direction of the driving wind during wiper operation and thus serves to increase the pressure of the wiper lip 18 against the window 10. This is useful because, particularly at high driving speeds, a number of factors combine to weaken the pressure of the wiper blade, which is indicated by the arrow 16 in FIG. 1. Moreover, it can be inferred from FIGS. 4 and 6 that over at least a longitudinal section, each of the spring elastic longitudinal strips 38 protrudes out of its longitudinal receiving groove 36 in the wiper strip 20 by means of an edge strip 50.

So that the wiper blade 12 can be pivotally connected to the wiper arm 14, an adapter 52 is provided, which is shown in a perspective view in FIG. 6, which has two securing elements 54, each of which is associated with one of the two edge strips 50. Each of the two securing elements 54 has an essentially C-shaped cross section. Their disposition in relation to each other is chosen so that the free ends of the C-arms 56 are directed toward each other. This results in the fact that the respective base walls 58 rest against the mutually remote sides of the C-arms 56. The remaining channel-shaped space 60 between the two C-arms 56 belonging to a securing element 54 serves to receive the edge strips 50 of longitudinal strips 38 or the support element 40 (FIGS. 3 and 4). FIG. 6 also shows that at the one end section of each securing element 54, there is a pivot pin 62 and that the two pivot pins are matched to each other so that they have a common longitudinal axis which, in the assembled state-shown later-coincides with the pivot axis 26 of the support bores 34. FIGS. 5 to 7 also show that spaced apart from the pivot or supporting pins 62 in each C-base wall 58 of the two securing elements 54, a resilient tab. 64 is embodied, which is connected at one end to the base wall and is provided with a detent catch 66 on its free end. The disposition of the two detent catches 66 on the two resilient tabs 64 is selected so that they are directed toward each other. In the embodiment of the invention to be described here, the two securing elements 54 are connected to each other by means of an essentially V-shaped band 68 (FIG. 3). To this end, each of the free ends of the V-arm 70 transitions in one piece into one of the two securing elements 54. The adapter 52 embodied in this manner is produced in one piece of a spring elastic plastic. Consequently, it is possible for the two resilient tabs 64 to experience a deflecting motion (arrow 78 in FIG. 7) directed counter to a restoring force. In addition, the two securing elements 54 belonging to the adapter 52 can be moved toward each other counter to a restoring force produced by the V-shaped band 68 that acts as a leaf spring.

In addition to the free end of the wiper arm 14 that is provided with the support bores 34, the device according to the invention for connecting the wiper blade to the wiper arm includes the edge strips 50 of the longitudinal strips 38, which belong to the support element 40, and the adapter 52, which performs a number of functions. The method for producing the connection will be explained below, particularly in conjunction with FIG. 6. First, the adapter 52 is compressed in the direction of the two arrows 72 until the two pivot pins 62 can be inserted between the side walls 32 of the wiper arm 14. This occurs counter to the restoring force of the V-shaped band 68 that acts as a leaf spring. The mounting of the adapter 52 onto the wiper arm 14 takes place in the direction of the arrow 74. As a result of an appropriate dimensional design of the adapter 52, now the two pivot pins 62 move into their support bores 64 and the base walls 58 of the two securing elements 54 come to rest in the vicinity of the side walls 32 with practically no play when the adapter 62 is released. After this assembly step, the adapter 52 is ready for further assembly without having to be specially secured for this. It hangs out of the U-shape of the wiper arm 14 with its end remote from the pivot pins 62 so that the resilient tabs 64 extend freely. In a subsequent assembly step, the wiper blade that is preassembled according to FIG. 6—the two longitudinal strips 38 resting in their longitudinal grooves 36 of the wiper strip 20—is inserted into the adapter 52 in the direction of the arrow 76 so that the two edge strips 50 of the longitudinal strips 38 travel into the channel-shaped spaces 60 of the two securing elements 54. In this assembly step, the two securing elements 54 are not pressed apart from each other or are only minimally pressed apart. When the two longitudinal strips 38 that constitute the support element 40 strike against the detent catches 66 protruding into the space 60, the resilient tabs 64 are deflected in the direction of the arrow 78 counter to a restoring force (FIG. 7) so that the wiper blade 12 can be slid further into the adapter 52 in the direction of the assembly arrow. In FIG. 7, both the one edge strip 50 and the assembly arrow 76 are shown with dot-and-dash lines. When the wiper blade 12 has reached the proper position in relation to the pivot axis 26, the detent catches 66 of each of the resilient tabs 64 snap into detent recesses 80, which are formed by recesses in the edge strips 50 that are open toward the edge. In the thus produced operating position of the wiper blade in relation to the wiper arm, the wiper blade is now pivoted around the pivot axis 26 in the direction of the arrow 82 in FIG. 1, into its operating position in which it comes into contact with its wiper strip 20 against the window 10. In so doing, the base walls 58 of the two securing elements 54, with the mutually remote outsides, are inserted between the U-arms 30 or between the side walls 32 of the U-arms 30 and are fittingly encompassed by them at the mutually remote outsides of the securing elements. In this connection, the term "fittingly" means that it is no longer possible to deflect the resilient tabs 64 in the direction of the arrows 78. On the other hand, however, there should not be any clamping action between the securing elements 54 of the adapter 52 and the U-arms 30 of the wiper arm 14 so that a free, unhindered oscillation of the wiper blade 12 around the pivot axis 26 is possible during wiper operation. In addition to its pivoting function—together with the wiper arm—and the wiper blade positioning—together with the edge strips 50 or with the detent recesses 80 provided in them—the adapter 52 also performs another securing function in that during operation of the wiper blade, the blade cannot become detached from the wiper arm 14 due to the detent catches 66, the detent recesses 80, and the locking that they produce together. In addition, with its two securing elements 54, the adapter 52 prevents the longitudinal spring strips 38 of the support element 40 disposed in the channel-shaped spaces 60 from slipping laterally out of the longitudinal grooves 36 during wiper operation. Even when the wiper blade, together with the wiper arm, is folded back away from the window in the direction of the era 84 in FIG. 1, the wiper blade cannot be unintentionally detached from the wiper arm, fall down against the body of the vehicle, and cause damage there. Finally, the leaf spring 68 connecting the two securing elements 54 on the one hand produces a simple mounting of the adapter between the side walls 32 and on the other hand, the V-shape of the leaf spring 68 permits the wind-deflecting strip 46 to be crossed over. Lateral recesses in the wind-deflecting strip 46, which require separate process steps, can consequently be eliminated.

As FIGS. 8 and 9 show, the distances 88 between the two C-arms 56 of the securing elements 54 are greater than the thickness 90 of the spring strip edge strips 50. With regard to a free mobility of the two longitudinal strips 38 or the support element 40 in the direction of the arrow 86, according to a first embodiment, a support lug 92 (FIG. 9) is disposed on the one inner wall of a C-arm, protruding toward the other C-arm. In the embodiment according to FIG. 8, there are two support lugs disposed spaced apart from each other on the one inner wall of the C-arm of the securing element. Both embodiments achieve the fact that during wiper operation, the longitudinal strips 38 or the support element 40 can oscillate freely in direction of the double arrow 86 so that the wiper lip can adapt to the surface progression of the window 10.

In order to detach the wiper blade 12 from the wiper arm 14 that has been folded back away from the window 10 (arrow 84 in FIG. 1), this wiper blade is pivoted around the pivot axis 26 (arrow 82 in FIG. 1) so that the resilient tabs 64 extend freely. Then with a tug in the direction of the arrow 76 in FIG. 7, the wiper strip 20, together with the longitudinal strips 38, can be pulled out from the securing elements 54 of the adapter 52 because the resilient tabs 64 can now be deflected and the detent catches 66 can come out of their detent recesses 80.

The essential method steps for producing a pivotal connection of the wiper blade 12 for windows 10 of motor vehicles to a wiper arm 14 will be explained clearly once again below. In a first assembly step, the securing elements 54 are inserted into their support bores 34 from the side walls 32 of the wiper arm 14 that are oriented away from each other and then the support element 40 provided with the wiper strip 20 or the two longitudinal strips 38 of this support element 40 are inserted with the edge strips 50 between the C-arms 56 of the securing elements 54 and securing means 66, 80 are activated to affix the support element 40 to the securing elements 54 or in relation to the wiper arm 14—because the securing elements with their pivot pins 62 are received by the support bores 34 of the wiper arm 14.

What is claimed is:

1. A device pivotally connecting a wiper blade (12) for motor vehicle windows (10) to a wiper arm (14), which is guided on a vehicle and can be moved between reversal points, which has two side walls (32), which are disposed parallel to and spaced apart from each other in a movement direction and extend toward the window, which are respectively penetrated by support bores (34) that share a common longitudinal axis (26) with an elongated rubber elastic wiper strip (20), which can be placed with a wiper lip (18) against the window (10) to be wiped and is secured by a band-shaped, elongated, spring elastic support element (40), and with two pivot pins (62) belonging to the pivotal connection, which are aligned lateral to the longitudinal span of the support element and are each guided in one of the two support bores (34), characterized in that on each of its longitudinal sides the wiper strip (20) has a longitudinal receiving groove (36) for a respective longitudinal strip (88) of the support element (40), each of which strips protrude with an edge strip (50) out of this receiving groove at least over a longitudinal section, that each edge strip is secured by a securing element (54), and that each of the two pivot pins (62) is disposed on a mutually remote longitudinal side of each of two securing elements.

2. The device according to claim 1, characterized in that at least over a longitudinal section, the wiper arm (14) has a substantially U-shaped cross section and that the support bores (34) are disposed in the U-arms (30) of the wiper arm (14) that constitute the side walls (32).

3. The device according to claim 1, characterized in that each of the two securing elements (54) has an essentially C-shaped cross section, whose C-arms (56) enclose the edge strips (50) of the longitudinal spring strips (38) of the support element (40), and that the pivot pins (62) are disposed on the outside of a respective base wall (58).

4. The device according to claim 3, characterized in that the pivot pins (62) are respectively disposed at the one end section of a securing element (54), that spaced apart from this securing element in each base wall (58) of the two securing elements (54) there is a resilient tab (64) connected to it at one end, which protrudes with a detent catch (66) into the channel-shaped receiving space (60) provided between the C-arms for each spring strip (38), and that the spring strips are each provided with a detent recess (80) associated with the respective detent catches (66).

5. The device according to claim 4, characterized in that with its side walls (32), the wiper arm (14) encompasses the base wall (58) of the two securing elements (54) against their mutually remote outsides.

6. A method for assembling a wiper blade and a wiper arm in a pivotal connection by means of a device of claim 4, with which in a first method step, the securing elements (54), with their pivotal pins (62), are inserted into their support bores (34) from the side walls (32) of the wiper arm (14) that face one another and then, the support element (40) provided with the wiper strip (20) is inserted with the edge strips (50) of its longitudinal strips (38) between the C-arms (56) of the securing elements (54), and securing means (66, 80) affix the support element to the securing elements.

7. The device according to claim 3, characterized in that distances (88) between the two C-arms (56) of each securing element (54) are greater than a thickness (90) of the spring strip edge strips (50) and that at least one support lug (92) is disposed on one inner wall of the C-arm of each securing element, protruding toward the other C-arm.

8. The device according to claim 1, characterized in that the two securing elements (54) are connected to each other by resilient means (58).

9. The device according to claim 8, characterized in that the resilient means are constituted by means of an essentially V-shaped band (68) that crosses the wiper strip (20), free ends of whose V-arms (70) are each connected to one of the two securing elements (54).

10. The device according to claim 9, characterized in that two spring elements (54) and a spring band (68) are made of an elastic plastic and are connected to each other in one piece.

* * * * *